UNITED STATES PATENT OFFICE.

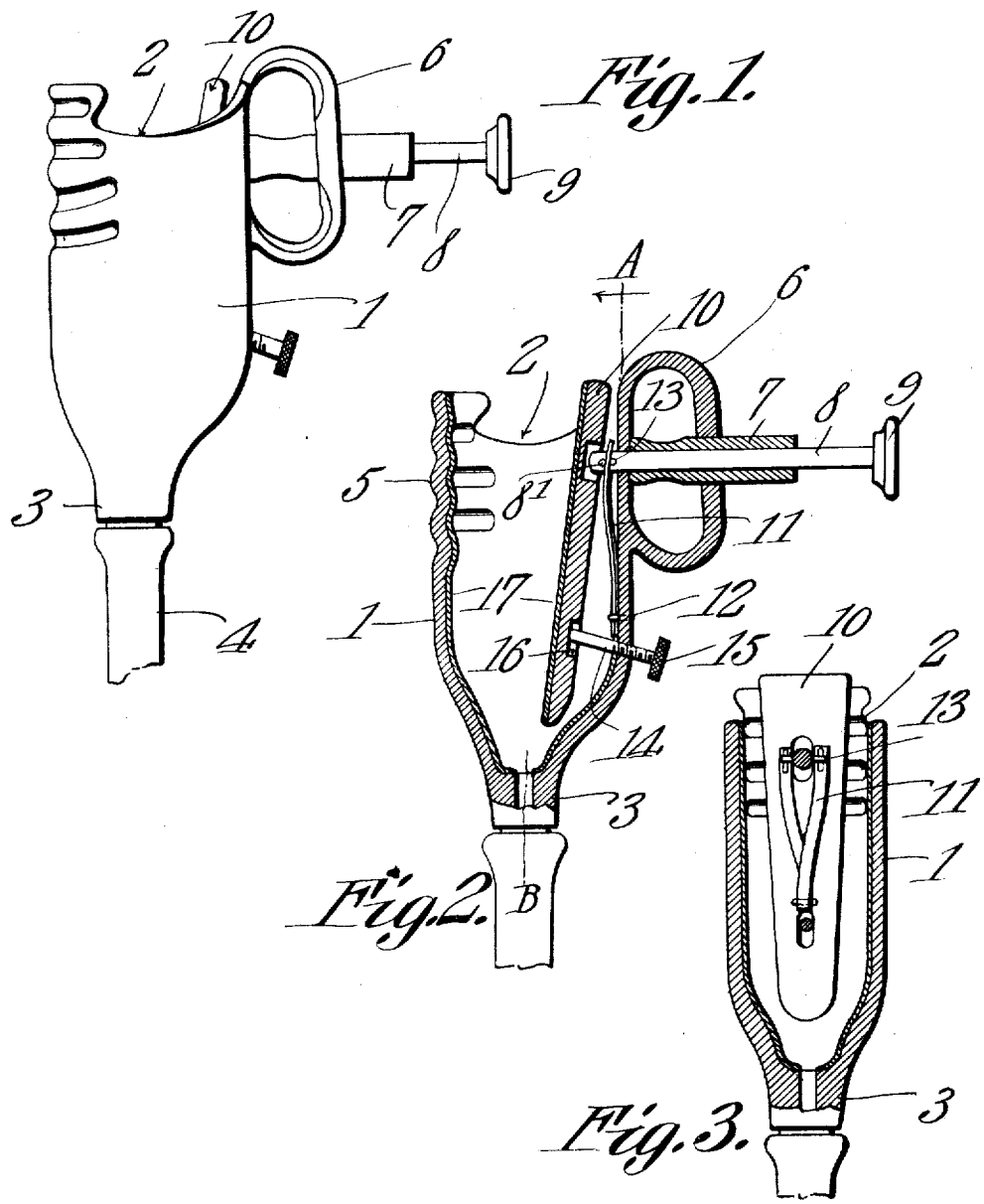

REUBEN D. ROTH, OF GETTYSBURG, PENNSYLVANIA.

MILKING-MACHINE.

945,812.

Specification of Letters Patent. Patented Jan. 11, 1910.

Application filed September 14, 1909. Serial No. 517,737.

*To all whom it may concern:*

Be it known that I, REUBEN D. ROTH, a citizen of the United States, residing at Gettysburg, in the county of Adams and State of Pennsylvania, have invented a new and useful Milking-Machine, of which the following is a specification.

This invention has reference to improvements in milking machines and is designed more particularly to provide a hand machine whereby the operation of milking may be performed without the necessity of grasping the teats of the cow directly in the hand.

In accordance with the present invention there is provided a cup or receptacle of such size as to readily receive a teat and provision is made for varying the effective capacity of the cup to accommodate teats of different sizes. Within the cup there is provided a pressure member controllable from the exterior of the cup by the hand of the operator so as to apply a progressive pressure from the root of the teat toward the tip thereof to cause the expulsion of the milk, and the cup is so shaped as to receive a portion of the udder when the milk therein is nearly exhausted, so that the device is adapted to milk the cow dry.

The invention will be best understood from a consideration of the following detail description taken in connection with the accompanying drawings forming a part of this specification, in which drawings, Figure 1 is an elevation of the device. Fig. 2 is a central section through the body thereof, with parts in elevation. Fig. 3 is a section on the line A—B of Fig. 2.

Referring to the drawings there is shown a teat cup or receptacle 1 conforming in general shape to the shape of a teat and large enough to receive the largest teat. One end of this cup is open and is cut away on two sides to form recesses 2, the purpose of which will appear hereinafter. The other end of the cup is contracted into a neck 3, shaped to receive a conduit 4 designed to lead into a milk receiving bucket or other receptacle.

The body portion of the cup 1 may be grooved on one side as indicated at 5 to conform to the shape of the fingers of the hand and on the other side the cup is provided with a handle 6 through the central portion of which there extends a tubular member 7 which may be either formed in one piece with the handle and body of the cup or may be separately formed therefrom and united thereto. The passage through the tube 7 matches a perforation in the body of the cup and mounted in this tubular member is a rod 8 terminating outside the tubular member in a push-button 9, the purpose of which will hereinafter appear.

Within the cup there is lodged a plate 10 pivotally connected to the rod 8 as indicated at 8'.

Connected at one end to the interior of the cup 1 near the discharge end thereof are leaf springs 11, the corresponding ends of these springs being passed one behind the other through a staple 12 so that while these springs are firmly held in place they may be readily removed for repair or cleaning. These springs 11 are appropriately bent or otherwise shaped and at their ends remote from those engaging the staple 12 they pass behind a pin 13, extending through the rod 8 and projecting from opposite sides thereof close to the pivot connection 8' between the rod 8 and the plate 10.

The tendency of the springs 11 is to maintain the plate 10 toward the corresponding side of the interior of the cup 1 but these springs will yield to a force applied to the button end 9 of the rod 8 so that the end of the plate 10 adjacent to the handle 6 and extending to the wide end of the cup 1 will be moved toward the other side of the cup. The other end of the plate 10 reaches to the neck end 3 of the cup and is there under control of a screw rod 14 extending through a threaded opening in the cup, and exterior to the latter provided with a manipulating head 15, while the end of the rod 14 remote from the head 15 engages in a recess 16 in the corresponding end of the plate 10.

The working faces of the interior of the cup 1 and of the plate 10 are covered with some soft elastic material such as rubber and indicated in the drawings at 17.

The cup may be made of any suitable material and may be lacquered or provided with any suitable protecting coating for sanitary purposes.

The cup 1 is placed about a teat and the thumb screw 14 is adjusted so that the teat is pressed between the plate 10 and the opposite face of the cup 1 and then by grasping the handle 6 with two of the fingers of one hand and either pressing the button 9 by the palm of the hand or by the thumb, the upper end of the plate 10 is forced toward the opposite side of the cup thus compressing the teat at the root end and forcing the milk from said teat toward the neck 3 from whence it will flow to the conduit 4 and to the pail or other receptacle provided for the purpose. By alternately releasing the rod 8 and plate 10 to the action of the springs 11 and then pressing the plate toward the opposite side of the cup, the milking may proceed as long as necessary. The milking may thus proceed until the udder above the teat begins to collapse because of the exhaustion of the contained milk when the cup 1 may be forced up against the udder which will collapse more or less into the recesses 2 so that the udder may be milked completely dry. The operation of milking may be performed on the several teats until completed.

For the purpose of cleansing or repair the plate 10 may be readily removed by withdrawing the pin of the pivot 8', this being the only positive attachment of the plate within the cup, and then the rod or bar 8 may be removed by withdrawing the pin 13 therefrom and the springs 11 may be withdrawn from the staple 12 and the thumb screw 14 may be also removed from the cup 1, thus leaving the interior thereof free for cleansing.

What is claimed is:

1. A milking machine comprising a teat receiving cup, a teat engaging member wholly housed within the confines of the cup and having a normal tendency in one direction, and a push-piece accessible from the exterior of the cup and connected to the teat engaging member near the end thereof adapted to contact with the root end of the teat.

2. A milking machine comprising a teat cup, a handle on one side thereof, a guiding member extending through the handle, a push piece accessible from the exterior of the cup and extending through the guide member to the interior of the cup and a teat engaging member within the cup secured to the push-piece and the end of the teat engaging member adapted to engage the root end of the teat.

3. A milking machine comprising a teat cup, a teat engaging plate therein, means accessible from the exterior of the cup for operating the said plate, and an adjustable thumb member for the end of the plate adjacent to the discharge end of the teat cup.

4. A milking machine comprising a teat receiving cup, a teat engaging plate therein, means for constraining the plate to a position away from a teat within the cup, means accessible from the exterior of the cup for moving the plate toward the teat, and an adjustable stop for the end of the plate adjacent to the discharge end of the cup.

5. A milking machine comprising a teat cup having the udder end recessed, a handle on the exterior of the cup, a push-piece extending through the handle, an elastically constrained plate within the cup connected at its udder end to the push-piece and an adjustable stop for the end of the plate adjacent to the discharge end of the cup.

In testimony that I claim the foregoing as my own, I have hereto affixed my signature in the presence of two witnesses.

REUBEN D. ROTH.

Witnesses:
JOHN W. TATE,
WM. B. DEARDORFF.